No. 775,769. PATENTED NOV. 22, 1904.
S. FEUST.
PIPE JOINT FOR AIR BRAKE CONNECTIONS.
APPLICATION FILED DEC. 9, 1903.
NO MODEL.
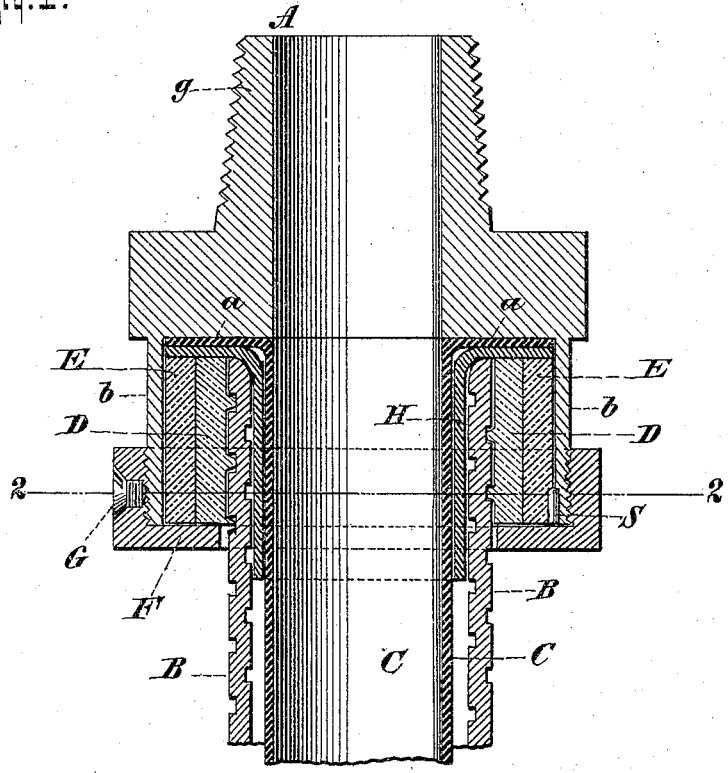
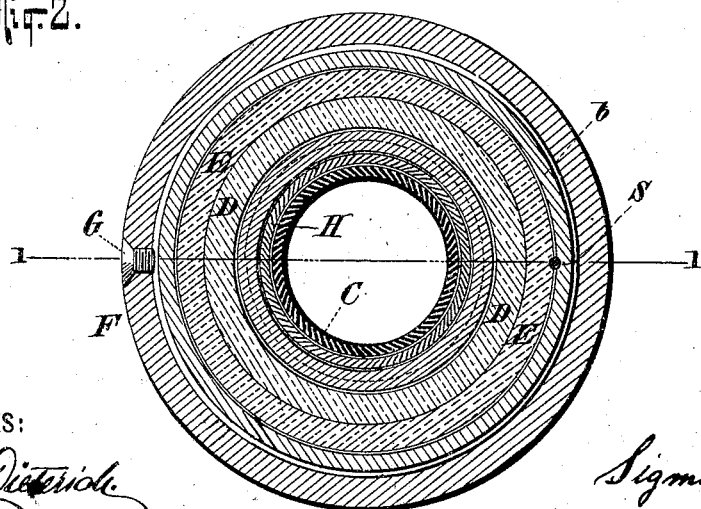
WITNESSES:
Gustave Dietrich
Edwin N. Dietrich
INVENTOR
Sigmund Feust
BY
J. Alexander Koones
ATTORNEY No. 775,769. Patented November 22, 1904.

UNITED STATES PATENT OFFICE.

SIGMUND FEUST, OF NEW YORK, N. Y.

PIPE-JOINT FOR AIR-BRAKE CONNECTIONS.

SPECIFICATION forming part of Letters Patent No. 775,769, dated November 22, 1904.

Application filed December 9, 1903. Serial No. 184,509. (No model.)

*To all whom it may concern:*

Be it known that I, SIGMUND FEUST, a citizen of the United States, and a resident of the borough of the Bronx, in the city of New York, county of New York, and State of New York, have invented new and useful Improvements in Pipe-Joints for Air-Brake Connections, of which the following is a full, clear, and exact description.

My invention relates to railway-air-brake connections composed of flexible hose of spirally-wound metal strips lined with rubber tubing and furnished at each end with a metal coupling; and my invention relates more particularly to the means of joining such hose with such couplings.

The object of my invention is to devise an air-tight joint which can be effected without soldering or brazing the metal tubing and couplings. In the Letters Patent of the United States numbered 735,735 and dated August 11, 1903, issued to Berton L. Wright and myself, such a joint is described; but in that case the ribs of the metal tubing are used as screw-threads and the end of the hose is screwed into the nipple of the coupling.

In the invention hereinafter described and claimed the end section of the rubber-lined metal tubing is covered with a metal bushing or metal bushings and then thrust into the bore of the nipple of the coupling and secured therein by suitable mechanical means.

Referring to the drawings, Figure 1 is a central longitudinal section of my improved joint. Fig. 2 is a cross-section of the same on the line 2 2 of Fig. 1.

In both figures of the drawings similar letters indicate similar parts.

A is the metal coupling, *b* its lengthened nipple, and *a* an annular seat therein.

B is the flexible metal tubing.

C is the rubber lining-tube with a flange.

D is a metal bushing upon the metal tubing.

E is a second bushing covering the first.

F is a flanged screw-threaded binding ring or nut; G, a set-screw; H, a metal ferrule, and S a pin or guiding or locking key.

My invention is intended for uniting to couplings flexible spirally-wound metal tubing of the kind described in the Letters Patent of the United States No. 330,910, dated November 24, 1885, and which were granted to E. Levavasseur.

The pipe-coupling A is of ordinary construction, except the nipple *b* is made longer and its bore of greater diameter than ordinarily. The difference in the diameters of the bore of the nipple *b* and the bore of the nipple *g* provides within the coupling an annular seat *a* for the end of the hose to bear upon. The nipple *b* is provided with male screw-threads with which the female screw-threads of the flanged binding nut or ring F will engage.

To make one of my improved joints, I make upon the exterior end portion of the metal tubing which is to enter into formation of the joint the sleeve or bushing D, which is preferably of Babbitt metal molded or cut in such a way that the spiral interstices between the folds of the metal tubing, which are covered by the bushing, are filled with spiral screw-threads integrally molded or cut upon the inside of the bushing. Upon this bushing D I place a second bushing, of hard metal, E. Upon the end of the flexible tubing B, I then seat a metal ferrule H and place the soft-rubber tubing within the metal tubing, so that the flange of the rubber tubing rests upon and covers the flange of the ferrule. The extremity of the metal tubing protected by the bushing, the ferrule, and the flange of the rubber tubing I then press or thrust into the bore of the nipple *b*, carefully guarding against any twisting or torsional strain upon the hose, its lining, ferrule, and bushing until the end of the hose reaches the annular seat *a*. The pin or locking-key S is then inserted between the nipple *b* and the bushing in a slot made to receive it. The binding-nut F, which I place upon the metal tubing before molding or locating any bushing thereon, is next screwed upon the nipple *b* until the hose is securely fastened to the coupling, and the end thereof is thereby compressed against the annular seat $a$. Finally, the nut F is secured to the nipple $b$ of the coupling and prevented from unscrewing by the binding-screw G, inserted in the nut F and operating against the nipple $b$. It will be observed that the joint is made without rotating or twisting the metal tubing, and this method of making the joint avoids spreading the ribs of the metal tubing and keeps them as air-tight as they were before the tubing was united with the coupling. Furthermore, it does not turn or rumple the rubber lining, which is a very important feature.

The flange of the rubber tubing and the ferrule H, employed for making an air-tight joint, are referred to in the aforesaid Letters Patent issued to Berton L. Wright and myself. In place of the rubber tubing used for lining and packing any other tubing of suitable material may be used for such purposes.

The second or outer bushing, E, may be omitted. The ferrule H may also be omitted; but in that case the edges of the end of the metal tubing and bushing should be broken or rounded, so as to prevent them cutting into the flange of the rubber tubing. The fastening and compressing mechanism described and shown I do not insist upon. The particular form of such mechanism shown does not constitute the substance of my invention, and the mechanism which may be used in place thereof for fastening and compressing is susceptible of wide variations. In place of the flanged nut screwed upon the nipple $b$ a flanged inside thimble may be screwed into such nipple $b$. For the set-screw G, if the outside binding-nut F be used, there may be substituted a binding-nut encircling the nipple $b$ and screwed toward the end of the nut F, or the set-screw G may be omitted and the nut F may be secured to the nipple $b$ by lead and oil or by similar means, and such variations will not materially change my invention.

It will be readily understood that the coupling A may be a pipe-coupling of the kind shown in the drawings or a coupling-head used on air-brake connections of familiar construction.

Having now described my invention, what I claim as new is—

1. In a pipe-joint for spirally-wound metal tubing, the combination of a coupling A of ordinary construction, but having one of its nipples lengthened and furnished interiorly with an annular seat $a$, with a bushing constructed interiorly with spiral threads which engage with the outside interstices of the metal tubing, the metal tubing B, the flanged rubber tubing C, the key S and a means for compressing the end of the metal tubing protected by the rubber flange against the seat $a$ and fastening in the coupling the tubing without rotating the bushing, tubing or lining.

2. In a pipe-joint for spirally-wound metal tubing, the combination of a coupling A of ordinary construction, but having one of its nipples lengthened, exteriorly screw-threaded and furnished interiorly with an annular seat $a$, with a bushing D constructed interiorly with spiral threads which engage with the outside interstices of the metal tubing, the metal tubing B, the flanged rubber tubing C, the key S, the flanged nut F which is screwed upon the nipple $b$ and bound thereto by the set-screw G, whereby the end of the metal tubing protected by the flange of the tubing C is compressed against the seat $a$ and the tubing, its bushing and lining are secured in the coupling without rotation.

3. In a pipe-joint for spirally-wound metal tubing, the combination of a coupling A of ordinary construction, but having one of its nipples lengthened, exteriorly screw-threaded and furnished interiorly with an annular seat $a$, with a bushing D constructed interiorly with spiral threads which engage with the outside interstices of the metal tubing, the metal tubing B, the flanged rubber tubing C, the flanged nut F which is screwed upon the nipple $b$ and bound thereto by the set-screw G, whereby the end of the metal tubing protected by the flange of the tubing C is compressed against the seat $a$ and the tubing, its bushing and lining are secured in the coupling without rotation.

4. In a pipe-joint for spirally-wound metal tubing, the combination of a coupling A of ordinary construction, but having one of its nipples lengthened, exteriorly screw-threaded and furnished interiorly with an annular seat $a$, with a bushing D constructed interiorly with spiral threads which engage with the outside interstices of the metal tubing, the bushing E covering the bushing D, the metal tubing B, the flanged rubber tubing C, the key S, the flanged nut F which is screwed upon the nipple $b$ and bound thereto by the set-screw G, whereby the end of the metal tubing protected by the flange of the tubing C is compressed against the seat $a$ and the tubing, its bushing and lining are secured in the coupling without rotation.

5. In a pipe-joint for spirally-wound metal tubing, the combination of a coupling A of ordinary construction, but having one of its nipples lengthened, exteriorly screw-threaded and furnished interiorly with an annular seat $a$, with a bushing D constructed interiorly with spiral threads which engage with the outside interstices of the metal tubing, the bushing E covering the bushing D, the metal tubing B, the flanged rubber tubing C, the flanged nut F which is screwed upon the nipple $b$ and bound thereto by the set-screw G, whereby the end of the metal tubing protected by the flange of the tubing C is compressed against the seat $a$ and the tubing, its bushing and lining are secured in the coupling without rotation.

6. In a pipe-joint for spirally-wound metal tubing, the combination of the key S, the coupling A and the bushing E, the key S being inserted between the nipple $b$ of the coupling A and the bushing E in a slot made to receive it.

SIGMUND FEUST.

Witnesses:
ALBERT MILLER,
MICHAEL MARKOWITZ.